May 5, 1959     A. LEVITT     2,884,708
ELECTRIC DISH DRYER

Filed July 24, 1956     2 Sheets-Sheet 1

INVENTOR.
Arnold Levitt
BY Ezekiel Wolf
his Attorney

May 5, 1959  A. LEVITT  2,884,708
ELECTRIC DISH DRYER
Filed July 24, 1956  2 Sheets-Sheet 2

INVENTOR.
Arnold Levitt
BY Ezekiel Wolf
his Attorney

United States Patent Office 2,884,708
Patented May 5, 1959

2,884,708

ELECTRIC DISH DRYER

Arnold Levitt, Brighton, Mass.

Application July 24, 1956, Serial No. 599,822

10 Claims. (Cl. 34—48)

The present invention relates to a device for drying dishes and similar utensils and in particular it relates to a drying device adapted to be used in the home in connection with the draining and drying of small numbers of eating utensils.

It is an object of the present invention to provide a device for draining and drying dishes which may be used in the home in a position conveniently adjacent the sink. Conventionally trays are often provided adjacent the sink in which dishes which have just been dried are allowed to drain and are then subsequently dried with towels.

It has been well known that drying dishes, glasses and cutlery with towels often leaves substantial amount of lint on the cleaned articles and consequently does not provide as satisfactory a cleaning as is obtained by the application of heat alone.

In electrically operated dryers, now being used, the units are conventionally formed as a portion of a washing machine and consequently occupies substantial space and in addition are quite expensive.

The present invention however, provides a structure which is compact in size and which may be used in the place conventionally occupied by the ordinary draining tray.

In the present invention there is provided in general a receptacle or pan section for receiving dishes and other utensils. Below this pan there is located a heating section consisting essentially of a heating coil suitably mounted. A control unit which preferably contains an "On," "Off" thermostatic switch and a control for the light is contained in a housing located at one end of the structure. Suitable drainage means are provided in the entire unit to permit excessive water to drain freely through the unit, thus permitting heat when applied to rapidly dry the dishes and other utensils.

Other objects and advantages of the present invention will be more clearly understood when considered in connection with the accompanying drawings, in which.

Figure 1:
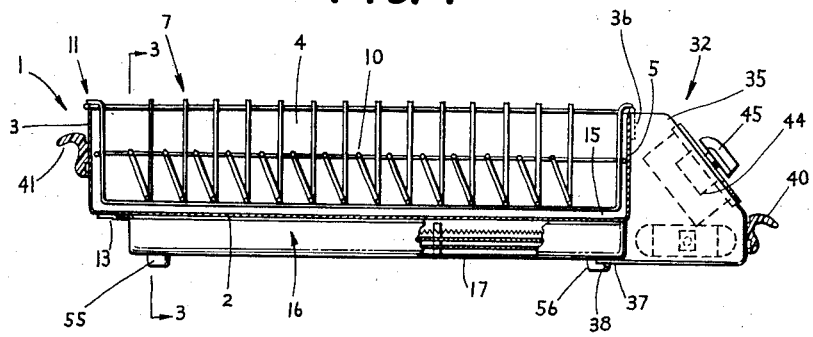
Figure 1 is a side partially fragmentary cross sectional elevation.

Referring to the drawings, there is provided a receptacle or pan 1 having a bottom 2 substantially rectangular in shape with upwardly extending side walls 3, 4, 5, and 6, continuous with one another and forming a receptacle adapted to receive cutlery, dishes and other eating and cooking utensils. A wire frame 7 may be secured within the pan 1 and may consist of a series of parallel wire elements 8 interconnected by several longitudinally extending wire elements 9. The wire elements 8 may be bent as illustrated at 10 to receive stacks of dishes. This wire frame-work 7 should be secured within the side walls of the pan 1 by welding or other suitable means. The frame may be secured at its periphery 11 to the upper lip of the side walls.

A pair of channel members 12 are secured to the underneath portion of the bottom 2 by suitable means, such as welding. This channel consists of a longitudinally extending strip of metal with the inner portion 14 offset from the outer portion 15, thus forming an inwardly extending longitudinal channel. The channels 12 may be interconnected by a channel section 13 at the rear end of the device. The interconnecting section 13 is complementary to the channels 12 and thereby forms together with the channels 12, a U shape continuous channel member adapted to receive and secure, the heating section hereinafter described.

The pan or receptacle 1 should be provided with drainage holes in the bottom 2 at positions such that excess water collected within the receptacle 1 may be drained freely outwardly of it. Such a drainage means may be provided by a hole located in the bottom 2 at a position beyond the heating section as indicated at 15.

Figure 2:
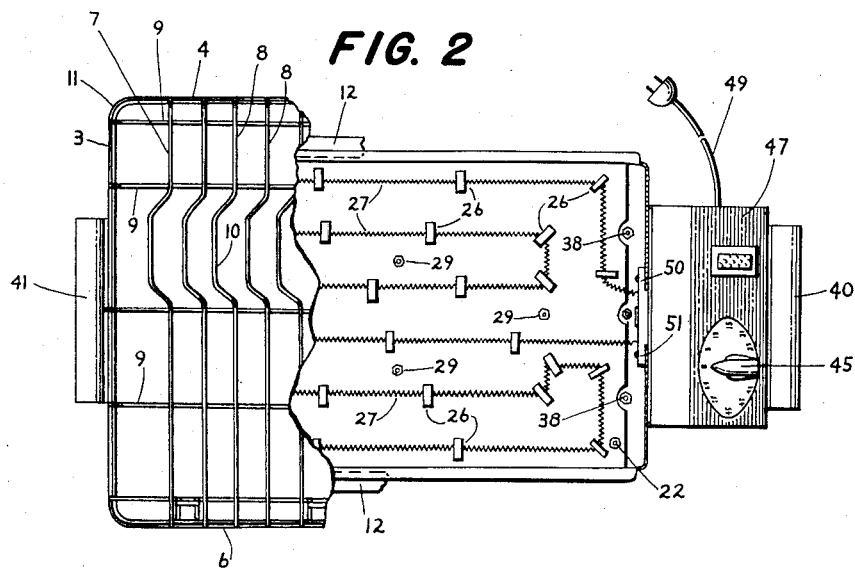
Figure 2 is a top plan fragmentary cross sectional view.
Figure 3:
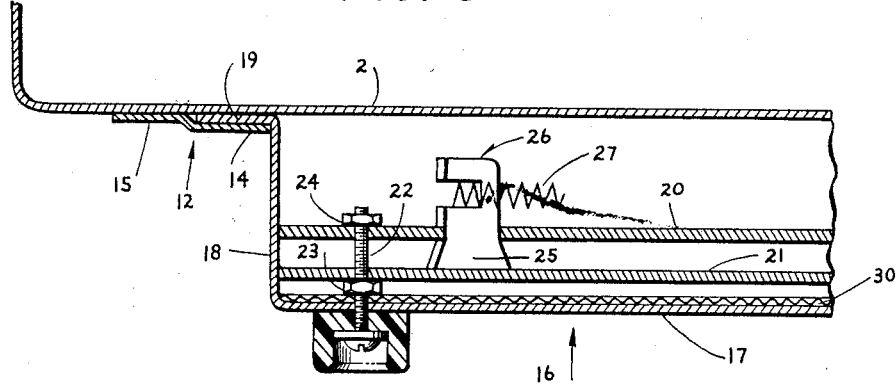
Figure 3 is a detail of the invention taken substantially along the line 3—3 of Figure 1.

The heating section 16 comprises essentially, a supporting member 17 having side walls 18 which extend upwardly and which terminate at their upper peripheral edge in an outwardly extending flange 19. The flange 19 need only extend about three sides of the side walls 18. This flange 19 slidingly fits into the channel member 12 and is secured to it as illustrated in Figure 3. The heating section 16 thus forms an enclosed unit within which there is positioned a pair of spaced, preferably reflective plates 20 and 21. These plates are secured in spaced relation to one another and to the bottom 17 by means of nuts and bolts or other suitable means positioned at the corners. Thus these plates may be secured by the bolts 22 which extend upwardly through the bottom 17 and plates 20 and 21 with the nuts 23 spacing the lowermost plate 21 from the bottom 17 and the nut 24 securing the unit together. The plates 20 and 21 are maintained in their spaced relation by the base portion 25 of the insulating supports 26. These insulating supports 26 project upwardly through openings in the plate 20 and are secured in fixed positions relative to one another by this plate 20. These insulating supports are provided to secure the high resistance heating coil 27 which extends about the heating section within the side walls of this section and adjacent the bottom 2. The heating coils 27 should have a geometric arrangement as generally illustrated in Figure 2 covering substantially the entire area of the pan or receptacle 1, thus assuring an even distribution of heat on to the bottom 2 of the pan 1. The plates 20 and 21 are additionally secured together by nuts and bolts 29 which extend through these two plates.

If desired an insulating pad 30 may be positioned on the bottom 17. This pad may be secured in place by the bolts 23.

A heat control section 32 is positioned at the forward end of the device and consists of an enclosing casing having side walls except at the rear and a bottom and top. This enclosing casing, preferably has an angular forward wall 35 which is adapted to support the control units for ready accessibility. The rear of this casing is preferably provided with a downwardly extending lip as indicated at 36 which extends below the level of the pan 1 and is provided with several screw holes. The pan 1 may thereby be secured to the casing 32 by several screws which pass through the forward side wall into the screw holes in the downwardly extending lip 36. A rearwardly extending flange 37 extends adjacent the bottom 17 and is secured to this bottom 17 by the screws 38. A pair of handle members 40 and 41 secured respectively on the forward wall of the casing 32 and the rear side wall of the pan 1 are provided for easy handling of the unit.

The casing 32 contains an "On," "Off" thermostatic control 44, with control elements 45 projecting from the face of the casing and an electric bulb 47 is also suitably secured in the casing and electric cord 49 having suitable plugs for insertion into the conventional electrical socket is connected in series with the switch 44 and light 47, or in any other suitable manner to indicate by the lighting of the bulb that the unit is on. The terminals of the "On," "Off" switch are connected to the terminals of the heating coil as indicated at 50 and 51. Thus the control switch 45 may control the specific temperature of the continuous heating coils 27 and thereby the amount of heat provided to the pan 1.

In order to provide proper drainage of the unit it is preferable to have a supporting leg 55 at the rear of the device somewhat larger than the supporting leg or legs 56 at the forward end of the device, thus causing water to drain forwardly and out of the drainage holes previously mentioned.

Figure 4:
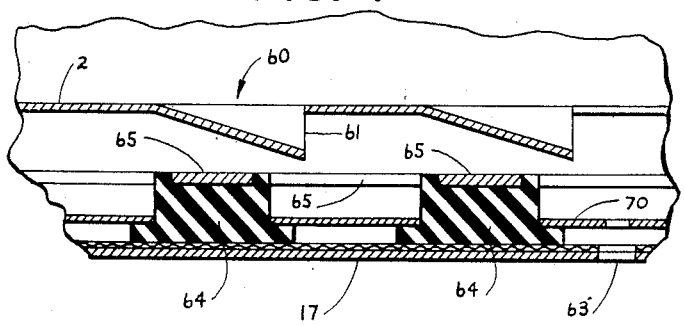
Figure 4 is a fragmentary cross sectional side elevation of a modification of the invention.
Figure 5:
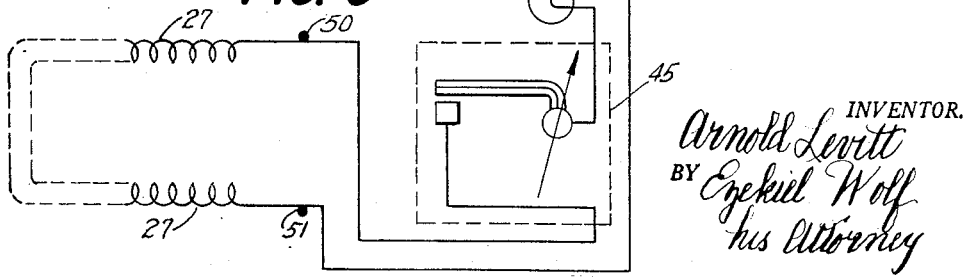
Figure 5 is a schematic wiring diagram of the present invention.

A further modification of the present invention is illustrated in Figure 4. In this modification, the bottom 2 of the receptacle 1 is provided with a series of louvres 60. These louvres which are preferably arranged on either side of the longitudinal center axis of the pan 1, are formed in the surface of the bottom 2 by punching rectangular sections of the bottom 2 downwardly providing openings 61 along the forward edge of the louvre. The supporting member 17 is also provided with drainage holes 63 at selected positions as for example, the forward end or perhaps at intermediate positions along its length. Supported on this supporting member 17 are a plurality of insulating members 64 which project upwardly and support the heating bars 65 which are continuous with one another. These heating bars are ribbon-like members which are formed of a high resistant material and when electric current is applied to them will heat at a fairly uniform temperature. As these heating coils or ribbons 65 are substantially stronger than the conventional heating coil water may be drained through the louvre openings 61 without any danger of damaging the unit with water which accidentally contacts the coils. However, these ribbons or coils 65 for additional safety are positioned in such a way that the water passing through the louvre 60 will pass between them and not directly to them. In this structure, the coils 65 are secured to the supporting members 64 as illustrated. These members 64 may in turn be secured in position between the plate 70 corresponding to plate 20 in Figure 1 and the bottom 17 with the insulating members 64 projecting through holes in the plate 70 from the enlarged bases of the insulating support.

Having now described my invention, I claim:

1. A device for drying dishes and the like, comprising a pan for receiving dishes and the like having sidewalls and a bottom wall, means providing parallel channels on said bottom wall, a coil supporting plate having sidewalls and flanges extending therefrom adapted to engage said channels, a pair of spaced parallel reflective plate members, means securing said plate members parallel to and between said plate and bottom wall, a plurality of insulating supports projecting through one of said plate members, said supports having enlarged bases secured between said plate members, a heating coil secured to the projecting portion of said supports, an electric power supply circuit connected across said coils for heating said coils, and an "On-Off" thermostatic control in said power supply circuit.

2. A device for drying dishes and the like comprising a pan for receiving dishes and the like, a heating section and a heat control section, said pan comprising a pan bottom wall and enclosing sidewalls with parallel channel members secured to the lower portion of said pan, said heating section comprising a bottom wall and enclosing sidewalls with flange means at the edges of said sidewalls adapted to engage said channels, a pair of spaced reflective plate members positioned between said pan bottom wall and bottom wall, insulating supports projecting through the uppermost plate member, said supports having enlarged bases secured between said plates and a heating coil extending about said insulating supports adjacent said bottom wall, and said heat control section comprising an enclosing case secured adjacent said heating section, an "On-Off" thermostatic control supported in said case and having a power supply circuit connected across said coil.

3. A device for drying dishes and the like comprising a pan for receiving dishes and the like, a heating section and a heat control section, said pan comprising a substantially rectangular receptacle with a bottom wall and enclosing sidewalls, and with parallel channel members secured to said bottom wall at positions spaced from the edges, said heating section comprising a bottom wall having overall width and length dimensions smaller than said pan and enclosing sidewalls with flange means at the edges of said sidewalls adapted to engage said channels, a pair of spaced reflective plate members positioned between said pan bottom wall and bottom wall insulating supports projecting through the uppermost plate member, said supports having enlarged bases secured between said plates and a heating coil extending about said insulating supports adjacent said bottom wall, said heat control section comprising an enclosing case positioned at one end of and adjacent said heating section, an "On-Off" control supported on said case and having a power supply circuit connected across said coil, and means providing drainage for said pan comprising means forming openings in said pan bottom wall and means for angularly supporting said pan.

4. A device for drying dishes and the like comprising a pan for receiving dishes and the like, a heating section and a heat control section, said pan comprising a pan bottom wall with a plurality of louvres formed thereon and enclosing sidewalls with parallel channel members secured to the lower portion of said pan, said heating section comprising a bottom having drainage means formed therein and enclosing sidewalls with flange means at the edges of the sidewalls adapted to engage said channels, a pair of spaced reflective plate members positioned between said pan bottom wall and bottom wall, insulating supports secured to said pair of plate members and projecting upwardly therefrom and a heating coil extending about and secured to said supports with said coil extending in positions below said bottom wall intermediate said louvres, said heat control section comprising an enclosing case secured adjacent said heating section, an "On-Off" electrical control supported on said case and having a power supply circuit connected across said coil.

5. A device as set forth in claim 4 wherein means are provided to support said pan with one end higher than the other.

6. A device as set forth in claim 4, wherein said coil comprises a continuous ribbon of high resistance metal.

7. A device for drying dishes comprising a pan for receiving dishes, a heating section and a heat control section, said pan comprising a pan bottom wall and sidewalls, said heating section comprising a bottom wall and enclosing sidewalls with means securing said sidewalls to the lower portion of said pan, reflective plate means positioned within said heating section and covering said bottom, insulating supports secured to and projecting from said reflective plate, an electric heating coil secured to said supports and positioned adjacent said bottom wall, and said heat control section comprising an enclosing member, an electrical power supply circuit positioned therein, an "On-Off" control in said circuit, said circuit being connected across the terminals of said coil means providing drainage for said pan comprising means forming openings in said pan bottom wall and means for angularly supporting said pan with said openings in the lowermost portion of said pan.

8. A device for drying dishes and the like comprising a pan for receiving dishes and the like, a heating section and a heat control section, said pan comprising a pan bottom wall and sidewalls, said heating section comprising a bottom wall and enclosing sidewalls with means securing said sidewalls to the lower portion of said pan, reflective plate means positioned within and covering said heating section, insulating supports secured to and projecting from said reflector plate, an electric heating coil secured to said supports and positioned adjacent said bottom wall, and said heat control section comprising an electrical power supply circuit an "On-Off" control, in said circuit, said circuit, being connected across the terminals of said coil means providing drainage for said pan comprising means forming openings in said pan bottom wall and means for angularly supporting said pan with said openings in the lowermost portion of said pan.

9. A device for drying dishes comprising a pan for receiving dishes and a heating unit, said pan having a pan bottom wall and sidewalls, said heating unit comprising a supporting bottom member and enclosing sidewalls with said sidewalls secured to the lower portion of said pan, reflective plate means positioned within said unit and covering said bottom unit, insulating supports secured to said plate means, an electric coil secured to said supports, a power supply circuit connected across the terminals of said coils means providing drainage for said pan comprising means forming openings in said pan bottom wall and means for angularly supporting said pan with said openings in the lowermost portion of said pan.

10. A device for drying dishes comprising a pan for receiving dishes having a pan bottom wall and sidewalls and a heating unit comprising a supporting bottom member and enclosing sidewalls positioned below and secured to said pan bottom wall, reflective plate means positioned within and covering the bottom of said unit, upwardly projecting insulating supports secured to said plate means, an electrical coil secured to said supports, a power supply circuit connected across the terminals of said coil means providing drainage for said pan comprising means forming openings in said pan bottom wall and means for angularly supporting said pan with said openings in the lowermost portion of said pan.

References Cited in the file of this patent
UNITED STATES PATENTS

| Number | Name | Date |
|---|---|---|
| 1,499,903 | Beck | July 1, 1924 |
| 1,532,718 | Shover | Apr. 7, 1925 |
| 1,843,455 | McGowen | Feb. 2, 1932 |
| 1,847,256 | Nielsen | Mar. 1, 1932 |
| 2,257,394 | Niersbach | Sept. 30, 1941 |
| 2,441,941 | Shafter | May 18, 1948 |
| 2,549,106 | Manacher | Apr. 17, 1951 |
| 2,651,703 | Atkins | Sept. 8, 1953 |
| 2,668,364 | Colton | Feb. 9, 1954 |
| 2,745,192 | Crise | May 15, 1956 |